United States Patent
Mackel et al.

(10) Patent No.: US 6,869,389 B2
(45) Date of Patent: Mar. 22, 2005

(54) CENTRIFUGE WITH SIEVE AND METHOD FOR OPERATING SAID CENTRIFUGE

(75) Inventors: Wilfried Mackel, Oelde (DE); Jochen Hamatschek, Oelde (DE)

(73) Assignee: Westfalia Separator AG, Oelde (DE)

( * ) Notice: Subject to any disclaimer, the term of this patent is extended or adjusted under 35 U.S.C. 154(b) by 62 days.

(21) Appl. No.: 10/297,435
(22) PCT Filed: May 5, 2001
(86) PCT No.: PCT/EP01/05333
§ 371 (c)(1), (2), (4) Date: Dec. 6, 2002
(87) PCT Pub. No.: WO01/93981
PCT Pub. Date: Dec. 13, 2001

(65) Prior Publication Data
US 2004/0029696 A1 Feb. 12, 2004

(51) Int. Cl.$^7$ .................................................. B04B 7/16
(52) U.S. Cl. ............................. 494/36; 494/37; 494/70
(58) Field of Search ............................. 494/36, 67–73, 494/27–28, 37

(56) References Cited

U.S. PATENT DOCUMENTS

| | | | | |
|---|---|---|---|---|
| 1,767,314 A | * | 6/1930 | Schmitz | 210/251 |
| 2,087,778 A | * | 7/1937 | Nelin | 494/36 |
| 2,594,445 A | * | 4/1952 | Keith, Jr. | 494/36 |
| 3,438,571 A | * | 4/1969 | Nilson et al. | 494/36 |
| 4,106,689 A | * | 8/1978 | Kozulla | 494/5 |
| 4,209,127 A | * | 6/1980 | Khapaev | 494/1 |
| 4,221,323 A | * | 9/1980 | Courtot | 494/10 |
| 4,271,019 A | * | 6/1981 | Galletti | 210/108 |
| 4,286,971 A | * | 9/1981 | Burcaw et al. | 95/189 |
| 4,427,407 A | * | 1/1984 | Paschedag | 494/70 |
| 4,482,344 A | * | 11/1984 | Zettier | 494/70 |
| 4,533,344 A | * | 8/1985 | Gunnewig | 494/36 |
| 4,780,212 A | * | 10/1988 | Kost et al. | 210/646 |
| 2003/0146146 A1 | * | 8/2003 | Mackel et al. | |
| 2004/0029696 A1 | * | 2/2004 | Mackel et al. | 494/36 |

FOREIGN PATENT DOCUMENTS

| | | | |
|---|---|---|---|
| DE | 2214487 A | * | 10/1972 |
| DE | 2529614 A | * | 1/1977 |
| DE | 3326708 C1 | | 7/1983 |
| DE | 3405153 A | * | 8/1985 |
| DE | 35 44082 A1 | | 12/1985 |
| DE | 468442 C | * | 11/2004 |
| DE | 10027959 A1 | * | 12/2004 |
| JP | 2001-179132 | * | 7/2004 |

* cited by examiner

Primary Examiner—Charles E. Cooley
(74) Attorney, Agent, or Firm—Barnes & Thornburg

(57) ABSTRACT

The present invention relates to a centrifuge that includes an inlet tube, a distributor, a centrifugal drum, a centrifugal chamber, a sieve and a solids collecting space. The present invention also relates to a method for cleaning the centrifuge including the step sieve opening the solids collecting space so that liquid from a liquid discharge space return flows through the sieve back into the solids discharge space, detaching one or more of solids and contaminants from the sieve and, discharging one or more of the solids and contaminants from the solids discharge space.

18 Claims, 3 Drawing Sheets

CENTRIFUGE WITH SIEVE AND METHOD FOR OPERATING SAID CENTRIFUGE

BACKGROUND AND SUMMARY OF THE INVENTION

The present invention relates to a centrifuge, particularly a separator, having an inlet tube and a distributor for introducing a material to be centrifuged into a centrifugal chamber bounded by a centrifugal drum. The centrifugal chamber includes a sieve essentially arranged coaxially with respect to the inlet tube and/or distributor. The distributor is designed such that it guides the material to be centrifuged into an area of the centrifugal chamber which is arranged radially outside the outer circumference of the sieve, such area being a solids collecting space. During centrifugal separating, a liquid component of the introduced material to be centrifuged flows radially from the outside toward the inside of the drum through the sieve. The present invention also relates to a method of operating and cleaning the centrifuge.

A centrifuge of the above-mentioned type and a method of its operation are known from German Patent Document DE 25 29 614 C2, which describes a device for the continuous rotation pressure filtration of liquid media. Filtrations in the sense of this document are sieve as well as membrane filtrations as well as micro- or ultra-filtrations. By a hydrostatic pressure difference, a concentrate flow component is generated parallel to the surface of the filter, for the purpose of which a hydrodynamic delivery pressure in the ring gap between the centrifugal drum and the coaxial drum-shaped filter element is generated in that the drum and the filter element are simultaneously acted upon by mutually different rotary frequencies. Allegedly, without the independent relative rotatability, an extremely surface-laminar cross-current component would be formed between the filters which has such a low efficiency that, already shortly after the start of the filtration, the fractionation process would cease as a result of polarization effects and pore sealing.

The separate rotatability of the sieve drum causes high constructive expenditures and thus considerably increases the costs of the centrifuge. For this reason, among others, it was found that the just-described solution has not been successful in practice.

It is also noted that, despite the relative rotatability of the sieve with respect to the centrifugal drum, a rerinsing of the membrane by a rinsing liquid is often required. However, such a rerinsing requires expenditures and interrupts the centrifuging operation for a considerable period of time.

The present invention further develops the initially described centrifuge such that, by simplified constructive and/or process-related expenditures, the problem of the clogging of the sieve by solid particles or the problem of an uncomplicated cleaning of the centrifuge is solved.

This is achieved, according to the present invention, by a centrifuge comprising an inlet tube a centrifugal drum and a centrifugal chamber bounded by the centrifugal drum. Also included is a sieve arranged in the centrifugal chamber coaxially with respect to one or both of the inlet tube and a distributor. A solids collecting space is in an area of the centrifugal chamber and is arranged radially outside an outer circumference of the sieve. The distributor arranged for introducing and guiding material to be centrifuged into the solids collecting space so that during centrifugal separation a liquid component of the introduced material flows radially from the solids collecting space toward an interior of the drum through the sieve. The solids collecting space is discontinuously closable so that when the solids collecting space is opened, a return flow of the liquid component takes place through the sieve from the interior of the drum.

The present invention also includes a method for cleaning the centrifuge.

As noted above, since the solids collecting space can be discontinuously closed, a return flow of the liquid component through the sieve takes place when the solids collecting space is opened up.

For discharging the solids, the solids collecting space is opened up particularly by opening a piston side valve, so that solids and/or contaminants attached to and/or deposited on the sieve or the sieve drum (and, under certain circumstances, also cloggings or cakings) are discharged through the opening(s) opened up by the piston slide valve.

In a simple fashion, this creates a cleaning effect of the sieve. This is because, when the piston slide valve is opened, liquid flows from the liquid discharge space through the sieve back into the solids collecting space, whereby solids clogging the sieve are now detached from the sieve and are discharged through the opening(s) opened up by the piston slide valve.

The present invention therefore utilizes the unexpected effect that, when the piston slide valves, which are known per se, are opened for discharging the solids, the sieve is cleaned in a simple manner which virtually does not interrupt the centrifuging operation. A special aspect of this cleaning is the fact that the return flow can take place without the additional use of a rinsing liquid and that, only after a relatively long operation, a rerinsing by means of such a rinsing liquid will be required. It should also be stressed that, because of modern control techniques, it is possible to control the emptying mechanism very precisely and thereby also control the cleaning effects in a desired manner.

As a result of the cleaning effect, a long service life of the membrane insert is therefore achieved without the requirement of a production stop because of clogging. As a result of the rapidity of the emptying mechanism and the realizable controlling of the discharge volume, the intensity of the cleaning effect can be controlled as a function of the product to be centrifuged.

The discharge of the concentrate by way of a separating plate or small tube, by way of ducts and nozzles outside the membrane insert is also conceivable. As a function of the product to be centrifuged, this may lead to a lengthening of the rerinsing intervals (emptying intervals). An automating of the point of time of the emptying, by monitoring the component discharged there, is also conceivable.

The draining of a partial flow of the concentrate by way of nozzles at the piston slide valve is also conceivable. For such a discharge by nozzles at the piston slide valve, reference is made to German Patent Document DE 22 14 487.

Instead of a piston slide valve, an analogously functioning, discontinuously operating opening mechanism can be used which is arranged radially outside the sieve drum.

The relative rotatability between the sieve drum and the drum shell therefore no longer has to be realized although, in principle, the lack of relative rotatability can also be combined with the present invention. In principle, the present invention can also be combined with the idea, also known per se, of a device for the continuous discharge of a solid component arranged in the solids collecting space, as long as the above-described flow-back effect is utilized for the cleaning.

It is possible to assign to and/or connect behind the sieve drum a stack of plates so that, after the clarification of the product in the sieve drum, a separation of different liquid components from one another can take place in the stack of plates.

In a particularly simple manner, the present invention combines the technology of modern piston slide valve separators, known per se, with the idea of a membrane sieve. This provides a type of "membrane separator" with the option of a component separation on the output side in a plate stack which, optionally in a surprising manner, easily solves the problem of the clogging of the sieves of the separators.

The solids collecting space preferably has a double-cone shape, and the sieve is designed as a membrane sieve, particularly as a ceramic membrane sieve.

Other aspects and novel features of the present invention will become apparent from the following detail description of the invention when considered in conjunction with the accompanying drawings.

DETAILED DESCRIPTION OF THE PREFERRED EMBODIMENTS

Figure 1:
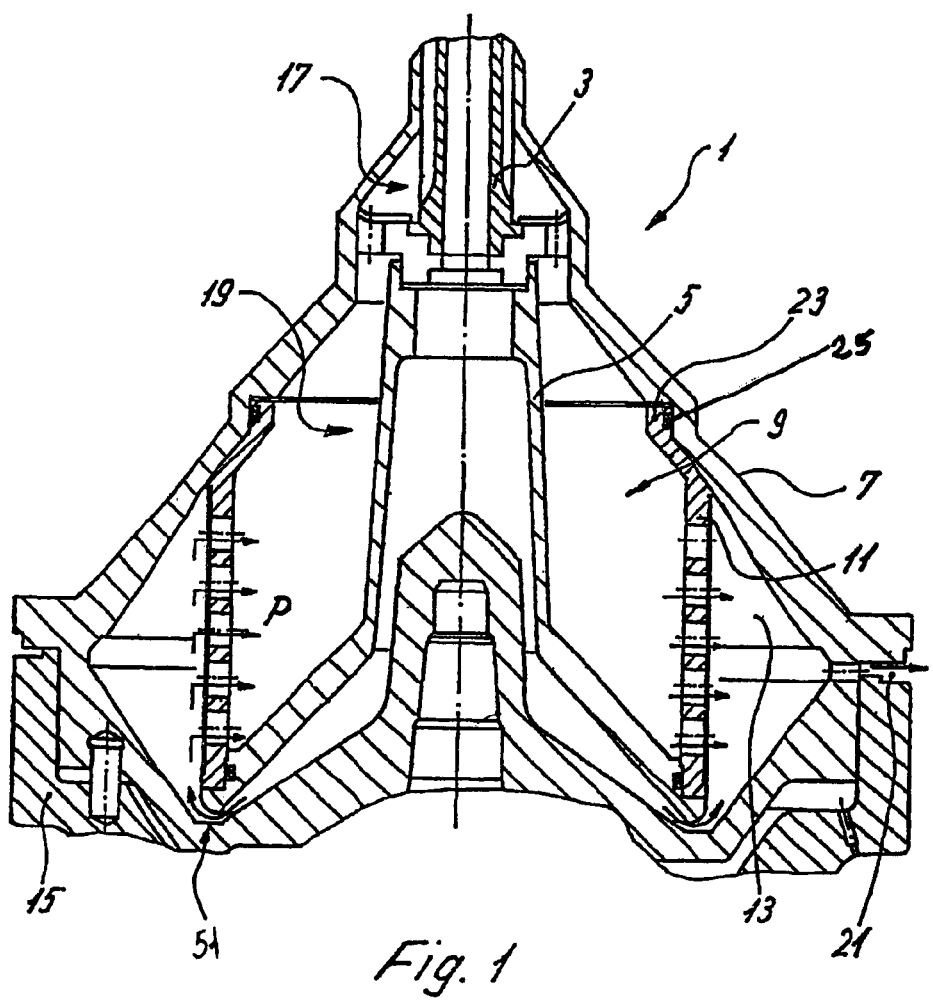
FIG. 1 is a sectional view of a centrifuge, the left part showing flow conditions during separation centrifuging, and the right part showing flow conditions during cleaning, according to the present invention.

FIG. 1 shows a separator 1 having an inlet tube 3 which leads into a distributor 5 which is used for introducing a material to be centrifuged into a double-cone centrifugal chamber 9. The chamber 9 is bounded by a (one-part or multi-part) centrifugal drum 7, in which centrifugal chamber 9 has a sieve or membrane sieve which may be arranged as a sieve drum 11, and which may be made of a ceramic material.

The distributor 5 extends into a lower area of the centrifugal drum 7 and is connected in its lower area with a lower edge of the sieve drum 11. That is done so that the material to be centrifuged in the lower area of the centrifugal drum 7 is guided radially through passage 51 toward the outside of the drum 7 into an area outside an outer circumference of the sieve drum 11, which all or part of forms a solids collecting space 13. From here, a liquid component P of the introduced material to be centrifuged, during separation centrifuging, flows radially from the area outside the outer circumference of the sieve drum 11 toward the interior of the drum 7 through membranes of the sieve drum 11. In an upper area, the sieve drum 11 has a conical shape. In an area of a ring groove 23, ending with sealing device 25, sieve drum 11 rests in sections against the interior wall of the centrifugal drum 7.

The solids collecting space 13 can be discontinuously opened and closed by piston slide valves 15. During the opening of the piston slide valve 15, solids are guided toward the outside of the drum 7 from the solids collecting space 13. A return flow of liquid is generated from a liquid discharge space 19 within the sieve drum 11. The sieve drum 11 is constructed as a membrane sieve through which the return flow detaches solids deposited on the membrane sieves and guides them toward the outside of the drum through piston slide valve openings 21.

From the liquid discharge space 19, the liquid component P is discharged through ducts 17 and/or by grippers.

Figure 2:
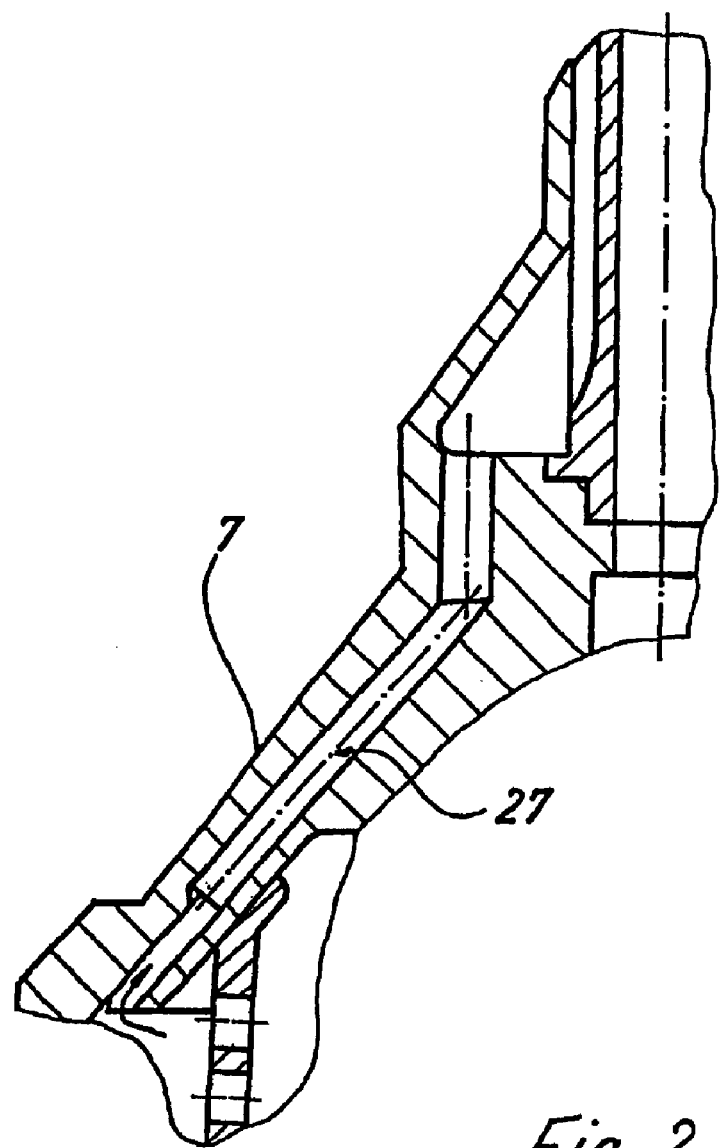
FIG. 2 is a sectional view of a section of another embodiment of a centrifuge, according to the present invention.

FIG. 2 shows a section of another embodiment of a centrifuge of the present invention having a duct 27 in a wall of the centrifugal drum 7 that may be used for discharging solid components. That discharging may or may not be continuous and a device for doing so may be the aforementioned duct 27 or it may be a separating plate, a tube or a nozzle.

Figure 3:
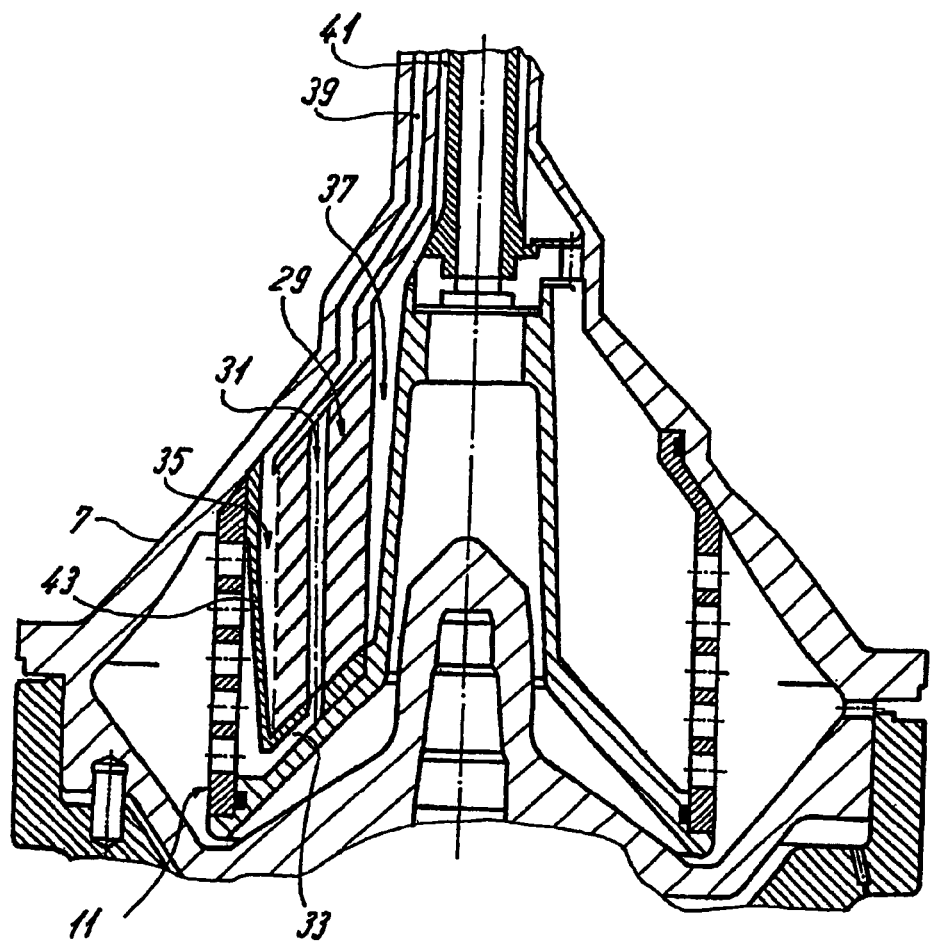
FIG. 3 is a sectional view of another embodiment of a showing centrifuge, in a left part of the centrifuge, a combination of a sieve and a plate stack, according to the present invention.

FIG. 3 shows an embodiment of the present invention having a plate stack 29. The plate stack 29 may be assigned to the sieve drum 11 or be inserted into or be adjacent to or be connected to the sieve drum 11. As an example, the plate stack 29 in FIG. 3, extends all around, but is shown only in the left part of FIG. 3. The plate stack 29 extends from an upper conical interior wall of the centrifugal drum 7 downward toward and/or adjacent a wall of the sieve drum 11 and may be fastened to the sieve drum 11. A holding device 43 at an outer circumference of the plate stack 29, which may be fastened to the sieve drum 11 and/or to the centrifugal drum 7, carries plates of the plate stack 29.

In the plate stack 29, rising ducts 31 are constructed to which product is fed by way of at least one feeding duct 33 at a lower edge of the plate stack 29, for example, between the plate stack 29 and the sieve drum 11.

Discharge ducts 35, 37 at an outer circumference and at an inner circumference of the plate stack 29 permit the discharging of various liquid components which are separated from one another when flowing through the plate stack 29. The two discharge ducts 35 and 37 lead into additional discharge ducts 39, 41 in a wall of the centrifugal drum 7.

The embodiment of the present invention shown in FIG. 3 includes sieving of the product to be clarified essentially as described above and shown in FIG. 1. However, after passing through the sieve drum 11, the clarified product enters the plate stack 29 through the feeding duct 33. Two liquid components of different densities may be separated from one another there and are then discharged by way of the discharge ducts 35, 37 at the inner and outer circumferences of the plate stack 29 and the additional adjoining discharge ducts 39, 41.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed is:
1. A centrifuge, comprising:
   an inlet tube;
   a centrifugal drum;
   a sieve;
   a distributor arranged for introducing and guiding material to be centrifuged through a passage without passing through the sieve into a solids collecting space so that during centrifugal separation a liquid component of the introduced material flows radially from the solids collecting space toward an interior of the drum through the sieve;

a centrifugal chamber bounded by the centrifugal drum;

the solids collecting space being, in an area of the centrifugal chamber arranged radially outside an outer circumference of the sieve;

the sieve arranged in the centrifugal chamber coaxially with respect to one or both of the inlet tube and distributor;

the solids collecting space being discontinuously closable so that when the solids collecting space is opened, a return flow of the liquid component takes place through the sieve from the interior of the drum; and wherein the solids collecting space is discontinuously closable by a piston slide valve.

2. The centrifuge according to claim 1, wherein the solids collecting space has a double cone shape.

3. The centrifuge according to claim 1, wherein the sieve is a membrane sieve.

4. The centrifuge according to claim 1, wherein the sieve is a ceramic membrane sieve.

5. The centrifuge according to claim 1, wherein the sieve is constructed as a sieve drum.

6. The centrifuge according to claim 1, wherein the distributor either extends into a lower area of the centrifugal drum or is connected with a lower edge of the centrifugal drum or both.

7. The centrifuge according to claim 1, wherein a device for the continuous discharge of solid components is arranged in the solids collecting space.

8. The centrifuge according to claim 7, wherein the device for the continuous discharge of the solid components is one of a separating plate, a tube and a nozzle.

9. The centrifuge according to claim 1, further including a plate stack interior to the sieve.

10. The centrifuge according to claim 9, wherein the plate stack is inserted into the sieve.

11. The centrifuge according to claim 9, wherein the plate stack extends from an interior wall of the centrifugal drum to a wall of the sieve.

12. The centrifuge according to claim 9, wherein rising ducts are constructed in the plate stack, to which the product is fed by way at least one of feeding duct.

13. The centrifuge according to claim 9, wherein discharge ducts are constructed on an outer circumference and an inner circumference of the plate stack.

14. The centrifuge according to claim 9, wherein a holding device at an outer circumference of the plate stack is fastened to one of the sieve and the centrifugal drum, and carries plates of the plate stack.

15. The centrifuge of claim 1, further including a plate stack connected to the sieve.

16. A method for cleaning a centrifuge, the centrifuge including a centrifuge chamber having a liquid discharge space, a sieve, a distributor arranged for introducing and guiding material to be centrifuged through a passage without passing through the sieve into a solids collecting space so that during centrifugal separation a liquid component of the introduced material flows radially from the solids collecting space toward an interior of a drum through the sieve, and the solids collecting space is discontinuously closable by a piston slide valve having openings, the method steps comprising:

operating the piston slide valve to open the solids collecting space so that liquid from the liquid discharge space return flows through the sieve back into the solids discharge space;

detaching one or more of solids and contaminants from the sieve; and discharging one or more of the solids and contaminants through the openings opened by the piston slide valve.

17. A centrifuge, comprising:

an inlet tube;

a centrifugal drum;

a distributor arranged for introducing and guiding material to be centrifuged into a solids collecting space so that during centrifugal separation, a liquid component of the introduced material flows radially from the solids collecting space toward an interior of the drum through the sieve;

a centrifugal chamber bounded by the centrifugal drum;

the solids collecting space being, in an area of the centrifugal chamber arranged radially outside an outer circumference of the sieve;

the sieve arranged in the centrifugal chamber coaxially with respect to one or both of the inlet tube and distributor;

the solids collecting space being discontinuously closable so that when the solids collecting space is opened, a return flow of the liquid component takes place through the sieve from the interior of the drum;

further including a plate stack interior to the sieve; and wherein discharge ducts are constructed on an outer circumference and an inner circumference of the plate stack.

18. A centrifuge, comprising:

an inlet tube;

a centrifugal drum; a sieve;

a distributor arranged for introducing and guiding material to be centrifuged into a solids collecting space being so that during centrifugal separation, a liquid component of the introduced material flows radically from the solids collection space toward an interior of the drum through the sieve;

a centrifugal chamber bounded by the centrifugal drum;

a solids collecting space, in an area of the centrifugal chamber arranged radially outside an outer circumference of the sieve;

the sieve arranged in the centrifugal chamber coaxially with respect to one or both of the inlet tube and distributor;

the solids collecting space being discontinuously closable so that when the solids collecting space is opened, a return flow of the liquid component takes place through the sieve from the interior of the drum;

further including a plate stack interior to the sieve; and wherein a holding device at an outer circumference of the plate stack is fastened to one of the sieve and the centrifugal drum, and carries plates of the plate stack.

* * * * *